United States Patent
Knappich et al.

(10) Patent No.: US 7,428,156 B2
(45) Date of Patent: Sep. 23, 2008

(54) MEMORY UNIT MOUNTING MODULE FOR VEHICLE NAVIGATION DEVICE

(76) Inventors: Walter Knappich, St. -Barbara-Straße 25, 76337 Waldbronn (DE); Frank Förderer, Langäckerweg 3a, 76571 Gaggenau (DE)

( * ) Notice: Subject to any disclaimer, the term of this patent is extended or adjusted under 35 U.S.C. 154(b) by 244 days.

(21) Appl. No.: 11/280,967

(22) Filed: Nov. 15, 2005

(65) Prior Publication Data
US 2006/0187630 A1 Aug. 24, 2006

(30) Foreign Application Priority Data
Nov. 15, 2004 (EP) .................................. 04027113

(51) Int. Cl.
*H05K 7/02* (2006.01)
(52) U.S. Cl. ...................................... 361/810; 361/807
(58) Field of Classification Search ................. 361/807, 361/801, 810; 174/138 G, 138 D
See application file for complete search history.

(56) References Cited

U.S. PATENT DOCUMENTS

| | | | | |
|---|---|---|---|---|
| 4,794,588 A | * | 12/1988 | Yoshitoshi et al. | 720/693 |
| 6,183,284 B1 | * | 2/2001 | Gill et al. | 439/327 |
| 6,324,153 B2 | * | 11/2001 | Furukawa et al. | 720/694 |
| 2002/0181205 A1 | * | 12/2002 | Shia et al. | 361/704 |
| 2006/0002076 A1 | * | 1/2006 | Albrecht et al. | 361/685 |
| 2006/0152386 A1 | * | 7/2006 | Yoshioka et al. | 340/996 |
| 2007/0064405 A1 | * | 3/2007 | Chen | 361/810 |

FOREIGN PATENT DOCUMENTS

| | | |
|---|---|---|
| JP | 60070358 | 4/1985 |
| JP | 60260039 | 11/1985 |
| JP | 61005440 | 1/1986 |
| JP | 02253229 | 9/1990 |
| JP | 06153861 | 7/1994 |
| JP | 07083870 | 4/1995 |

* cited by examiner

*Primary Examiner*—Dean A. Reichard
*Assistant Examiner*—Yuriy Semenenko
(74) *Attorney, Agent, or Firm*—The Eclipse Group LLP (57) ABSTRACT

A memory unit mounting module is provided for an on-board vehicle navigation device. The memory unit mounting module includes a memory unit and a support plate inside a housing of the navigation device and absorbing means arranged between the support plate and the memory unit for protecting the memory unit against shock and/or vibration, The absorbing means includes at least one spring element that may support the memory unit, and at least one damping element for absorbing shock and/or vibration of the memory unit.

20 Claims, 12 Drawing Sheets

MEMORY UNIT MOUNTING MODULE FOR VEHICLE NAVIGATION DEVICE

CROSS REFERENCE TO RELATED APPLICATIONS

This application claims priority of European Patent Application Serial Number 04 027 113.2 filed Nov. 15, 2004, titled NAVIGATION DEVICE OF A VEHICLE AND MEMORY UNIT MOUNTING SYSTEM, which is incorporated by reference in this application in its entirety.

BACKGROUND OF THE INVENTION

1. Field of the Invention

This invention relates to a memory unit mounting module and, in particular, a memory unit mounting module for use with a vehicle navigation device.

2. Related Art

Computer-based navigation devices are available for on-board use in vehicles. These navigation devices provide end-users, such as drivers of vehicles in which the navigation devices are installed, with various navigation functions and features. Navigation devices are able to determine a route from a present vehicle position to a selected vehicle destination. To provide the navigation function, some navigation devices access and use a detailed database that includes data representing physical features in a geographic region. Some detailed databases include data representing road and intersection locations and information about the roads, such as turn restrictions, speed limits, address ranges and further route mapping and planning information. For example, some detailed data bases include information related to points of interest (POI), such as factual information regarding monuments, sightseeing places, restaurants, and other types of vehicle travel destinations.

Given the relatively large electronic memory capacity needed for such detailed data bases for on-board navigation devices, geographic and other data are often stored on a memory unit such as a CD-rom disk. The demand for on-board access in vehicle navigation devices to ever increasing volumes of data has resulted in efforts to include hard disks and similar electronic memory units in these devices. When a hard disk is used in an on-board navigation device in a vehicle, several problems arise. The navigation device needs to be able to accurately read data from the hard disk while the vehicle is in motion, in spite of exposure of the hard disk to shocks and vibrations. Some navigation devices have addressed these problems by securing a memory unit to a housing of the navigation device. The memory unit cannot be assured in all normal driving circumstances to properly read data in such a navigation device, as shocks or vibrations due to the road surface on which the vehicle is moving can disturb the reading of the data.

Damping elements are used in combination with disk drives for portable computers such as laptops, as a shock protective mechanism to reduce damage in such computers from motion shocks. However, in these applications, the disk drive is locked during transportation of the computer. The damping elements are also mechanically locked during transportation because the damping elements could be destroyed or displaced within the shock protective mechanism by exposure to a strong shock, such as the shock experienced by a portable computer or other portable electronic device, including the disk drive, when the computer falls or is dropped.

Therefore, a need exists for a memory unit mounting module for use with an on-board vehicle navigation device that is able to protect an electronic memory unit, such as a hard disk, from vibrations and/or shocks and that will properly function when the vehicle, in which the navigation device is installed, is moving.

SUMMARY

A memory unit mounting module for an on-board vehicle navigation device is provided. The memory unit mounting module may include a memory unit and a support plate, at least one spring element supporting the memory unit, and at least one damping element for absorbing shock and/or vibration of the memory unit.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
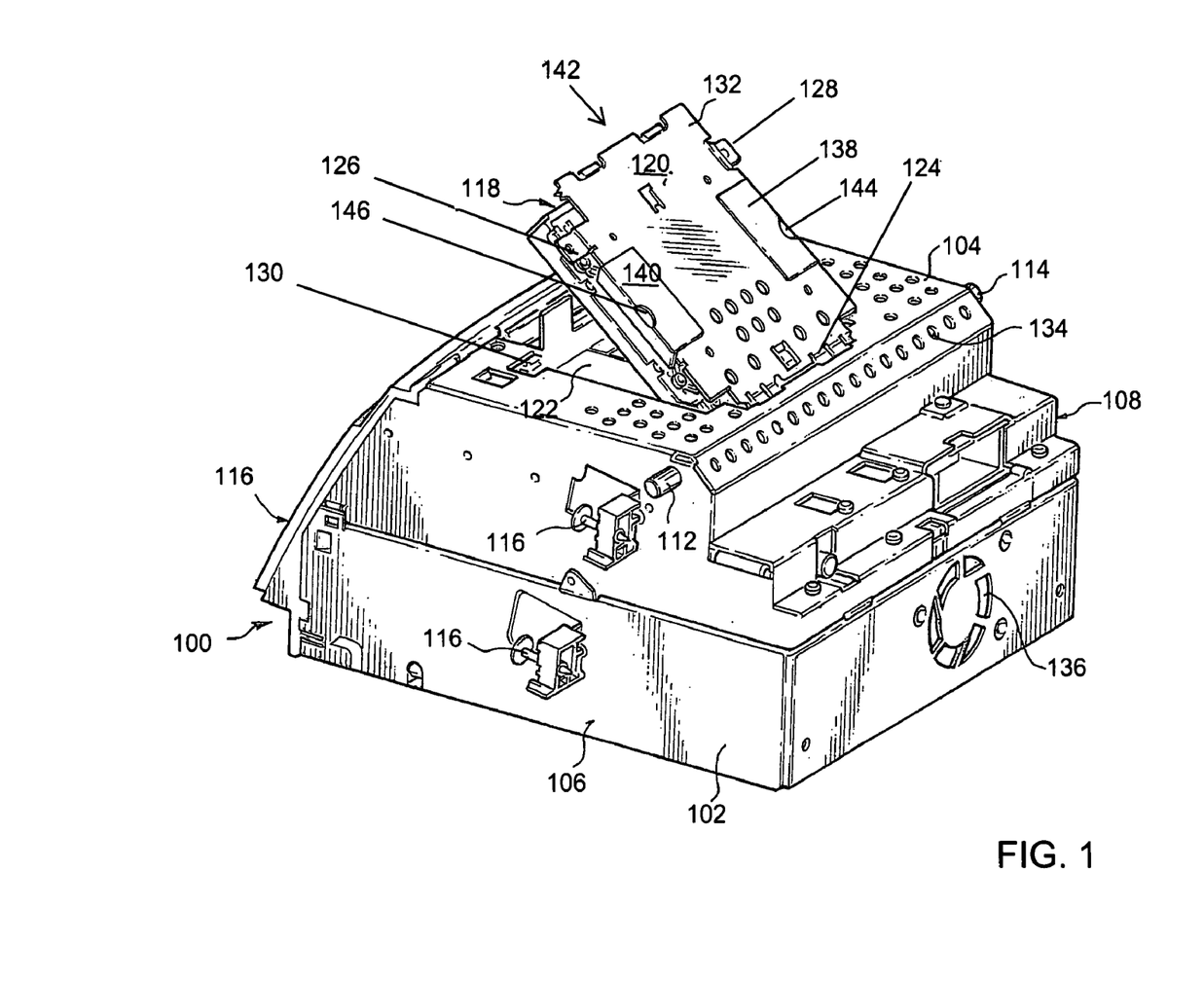
FIG. 1 is a perspective view of an example of one implementation of a navigation device that includes a memory unit mounting module.

FIG. 1 is a perspective view of an example of one implementation of a navigation device 100 that includes a memory unit mounting module 118. The navigation device 100 may be installed in a housing 102, the housing 102 having a bottom side 104 and two lateral sides 106 and 108. On a front side 110 of the housing 102, an operation module (not shown) may be installed and utilized to control the navigation device 100. It is understood that the navigation device 100 may not be limited to utilization, together with such an electronic operation module, as a vehicle navigation module. As an example, the navigation device 100 may be part of a multi-media module that may be located in the housing 102, including any combination of other modules such as an audio module, a radio module and a telecommunication module. The housing 102 may, as an example, have a plurality of pins, such as the two pins 112 and 114, that may help to locate and position the housing 102 in corresponding recesses (not shown) provided in a vehicle dashboard. The housing 102 may then be connected to the vehicle dashboard using, as an example, the fixing elements 116. It is understood that one or more fixing elements having a different structure and mode of operation than the fixing elements 116 shown in FIG. 1 may be utilized.

The navigation device 100 may further include a memory unit mounting module 118, in which a hard disk or other electronic memory unit for storing all the data necessary to guide the user of the vehicle from a present position to a predetermined destination location may be installed. The memory unit mounting module 118 may include a support plate 120. The memory unit mounting module 118 as shown in FIG. 1 has not been completely installed into the housing 102. The memory unit mounting module 118 may be introduced for such installation into a recess 122 provided in the bottom side 104 of the housing 102 having a shape suited for accommodation of the memory unit mounting module 118. Mounting tabs 124, shown also in FIG. 6, may be inserted into corresponding slots (not shown) in the bottom side 104. The memory unit mounting module 118 may then be pivoted to a position where the support plate 120 may be flush with the bottom side 104 of the housing 102. The support plate 120 may have laterally extending arms 126 and 128 located for alignment, upon such installation, with lateral grooves in the bottom side 104. As an example, the lateral groove 130 is shown in FIG. 1.

When the memory unit mounting module 118 is fully installed in the navigation device 100, the bottom surface 132 of the support plate 120 may form a part of the bottom side 104 of the housing 102. As an example, if an electronic memory unit forming part of the memory unit mounting module 118 in the navigation device 100 needs to be replaced or repaired, the memory unit mounting module 118 may be easily removed from the navigation device 100. The housing 102 may further include cut-outs in the housing 102 that may help to dissipate heat produced by operation of electronic components of the navigation device 100. As an example, the housing 102 may have a plurality of circular cutouts 134 and a plurality of elongated cutouts 136.

Figure 2:
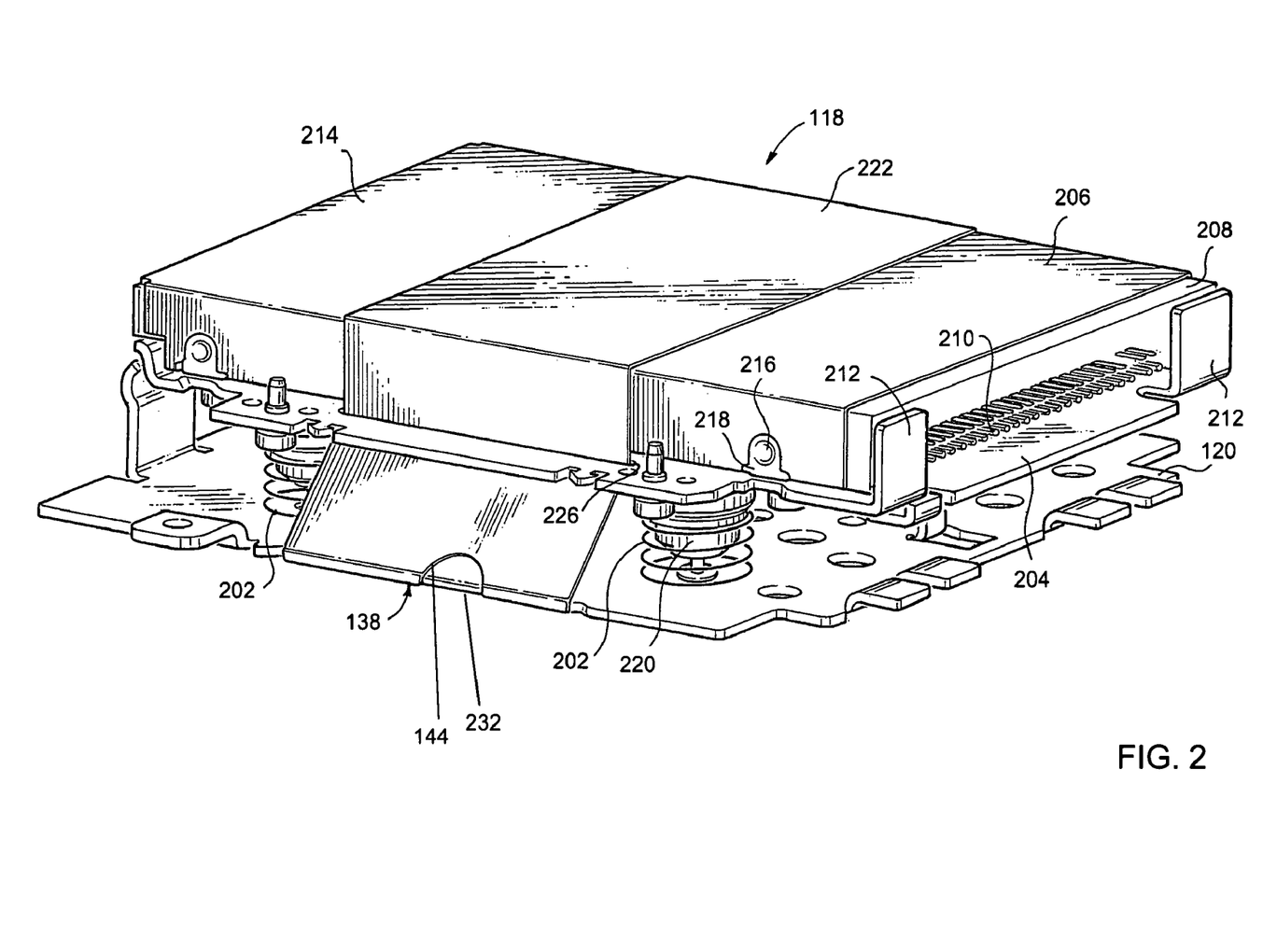
FIG. 2 is a perspective view of the memory unit mounting module of FIG. 1 removed from the navigation device, with its support plate positioned downward.

FIG. 2 is a perspective view of the memory unit mounting module 118 of FIG. 1 removed from the navigation device, with its support plate 120 positioned downward. The memory unit mounting module 118 is positioned in FIG. 2 consistent with an orientation that the memory unit mounting module 118 may have when the navigation device 100 is installed in the dashboard of a vehicle with the bottom side 104 facing downward. The support plate 120 of the memory unit mounting module 118 may as an example have four spring elements 202, only two of which are visible in FIG. 2. The four spring elements 202 may support a frame 204. The frame 204 may carry a cover 206, in which an electronic memory unit 208 may be installed. The electronic memory unit 208 is a medium capable of storing data in electronic form and reading electronic data, including, but not limited to, a hard disk memory drive. The electronic memory unit 208 may, as an example, store for retrieval the data needed for the navigation device 100 to calculate a route to a predetermined destination location for a vehicle. The electronic memory unit 208 may include an array of contact pins 210. A corresponding connector (not shown) may be connected with the contact pins 210 in order to enable a data exchange by the electronic memory unit 208 with other components of the navigation device 100. The frame 204 may have two vertically upstanding arms 212 that may facilitate correct fitting of the corresponding connector onto the contact pins 210. As another example (not shown), the electronic memory unit 208 may serve the functions of the frame 204 and the frame 204 may be omitted.

The electronic memory unit 208 may itself emit electromagnetic radiation or generate an electrostatic charge. Where the electronic memory unit 208 is installed in a navigation device 100 for a vehicle, such electromagnetic radiation and electrostatic charges may potentially interfere with the operation of other electronic components of the navigation device 100 unless the other components are adequately shielded from the radiation. The cover 206 accordingly may, as an example, have an electrically conducting outer surface 214 to shield the other components of the navigation device 100 from potential electromagnetic or electrostatic interference that may be generated by the electronic memory unit 208. As examples, the electrically conducting outer surface 214 may include aluminum, steel, precious metals, a conductive plastic, or any other electrically conducting material. In an example, the electrically conducting outer surface 214 may be formed of a light weight electrically conducting material. The cover 206 may include an electrically insulating inner surface (not shown) that may prevent electrical contact between the electronic memory unit 208 and the cover 206. As an example, the electrically insulating inner surface may be formed as a coating of an electrically insulating material. As an example, the electrically insulating material may be a dielectric polymer layer, sheet or film. In an example, the material may include polyethylene terephthalate. The electronic memory unit 208 may be attached to the cover 206. The attachment may be, as examples, mechanical or adhesive. As an example, the electronic memory unit 208 may have protrusions 216 that may engage recesses 218 in the cover 206.

The combined weight of the frame 204, the cover 206 and the electronic memory unit 208 may be carried by the four spring elements 202 when the memory unit mounting module 118 is in a "resting position", meaning that the module 118 is not being subjected to external motion forces such as vibrations or shocks. The spring elements 202 may vertically extend across the distance between and be attached to the frame 204 and the support plate 120. The vertical extension of the spring elements 202 in a resting position may be determined by selection of the overall dimensions and compressive strength of the spring elements 202, and consideration of the combined weight of the frame 204, the cover 206, and the electronic memory unit 208. The spring elements 202 may help to absorb shocks applied, by any external motion forces exerted on the memory unit mounting module 118, to the cover 206 or the electronic memory unit 208 in a direction between the frame 204 and the support plate 120.

The memory unit mounting module 118 may further include damping elements 220 interposed between the frame 204 and the support plate 120. The damping elements 220 may as an example be attached to the frame 204 but not be attached to the support plate 120. The vertical extension of the spring elements 202 spanning the distance between the frame 204 and the support plate 120 in a resting position may be longer than a height of the damping elements 220 partially extending in the same direction from the frame 204 toward the support plate 120. The damping elements 220 may accordingly be spaced apart from the support plate 120 when the memory unit mounting module 118 is in a resting position. The damping elements 220 accordingly may not be under any compression between the frame 204 and the support plate 120 at such a resting position, as the combined weight of the frame 204, the cover 206 and the electronic memory unit 208 may then be carried solely by the spring elements 202. As an example, the damping elements 220 may as shown in FIG. 2 be in mutual alignment with the spring elements 202 in a direction spanning the distance between the frame 204 and the support plate 120. In another example (not shown), the damping elements may be attached to the support plate 120 but not be attached to the frame 204. As a further example (not shown) the damping elements may not be in mutual alignment with the spring elements 202.

In an additional example (not shown), the damping elements 220 may be replaced by a resilient pad (not shown). The resilient pad may be made of a resilient material that may become deformed when a force is applied. The resiliency and the shape of the resilient pad may determine the force-absorbing characteristics of the resilient pad. The resilient pad may be interposed between the frame 204 and the support plate 120.

Movement of a vehicle in which the navigation device 100 is installed may, as an example, generate an external motion force applied to the navigation device 100. The external motion force may then, as an example, move the electronic memory unit 208 toward the support plate 120. This movement of the electronic memory unit 208 may be initially decelerated by compression of the spring elements 202. If as an example the external motion then moves the memory unit 208 still further toward the support plate 120, the damping elements 220 may make contact with the support plate 120. The damping elements 220 may then be deformed in proportion with the amount of such external motion force that is applied to the memory unit 208. As an example, the damping elements 220 may not be deformed at all when the memory unit mounting module 118 is in a resting position as explained above. An external motion force may then cause the damping elements 220 to make contact with the support plate 120. The damping elements 220 may in that case more effectively decelerate further movement of the electronic memory unit 208 toward the support plate 120 than if the damping elements 220 were arranged to themselves support a portion or all of the combined weight of the frame 204, the cover 206 and the electronic memory unit 208 when the memory unit mounting module 118 is in a resting position.

Figure 3:
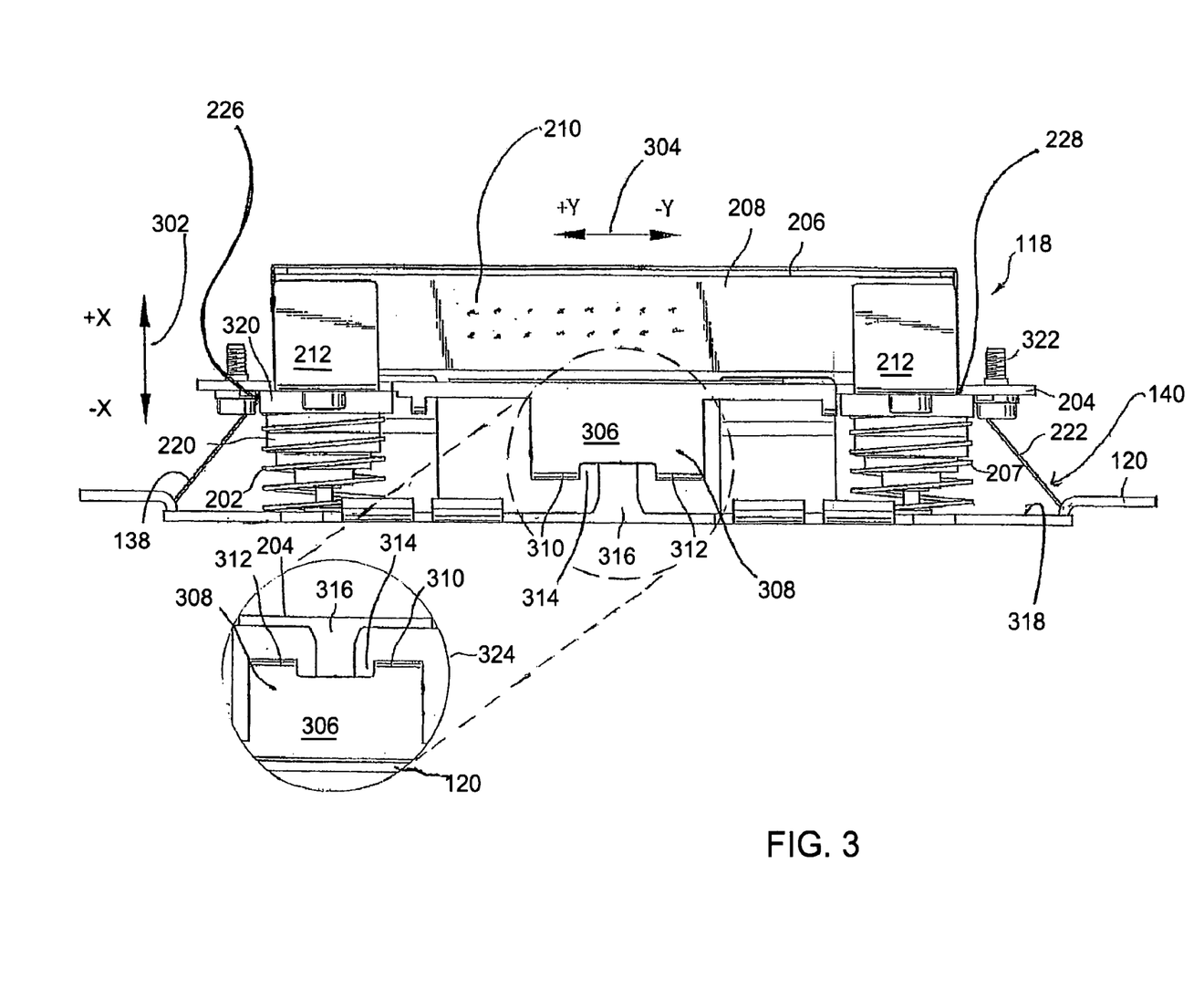
FIG. 3 is a rear view of the memory unit mounting module of FIG. 2.

The memory unit mounting module 118 may include a fixing strip 222. The fixing strip 222 may help to maintain the support plate 120, the frame 204 and the cover 206 in relative alignment with each other as shown in FIG. 2. The fixing strip 222 may, as an example, have an adhesive inner surface (not shown), that may be a self-adhesive surface. The fixing strip 222 may be attached to the bottom surface 132 of the support plate 120 by a first end 138 also shown in FIG. 1. The fixing strip 222 may pass through a first cut-out section 226 provided in the frame 204. The fixing strip 222 may wrap around the cover 206 so that the adhesive inner surface fixes the cover 206 and the fixing strip 222 relative to each other. The fixing strip 222 may pass through a second cut-out section 228 that may be provided in the frame 204, and may be located as indicated in FIG. 3 discussed next below. A second end 140 of the fixing strip 222, shown in FIG. 1, may also be attached to the bottom surface 132 of the support plate 120.

Figure 4:
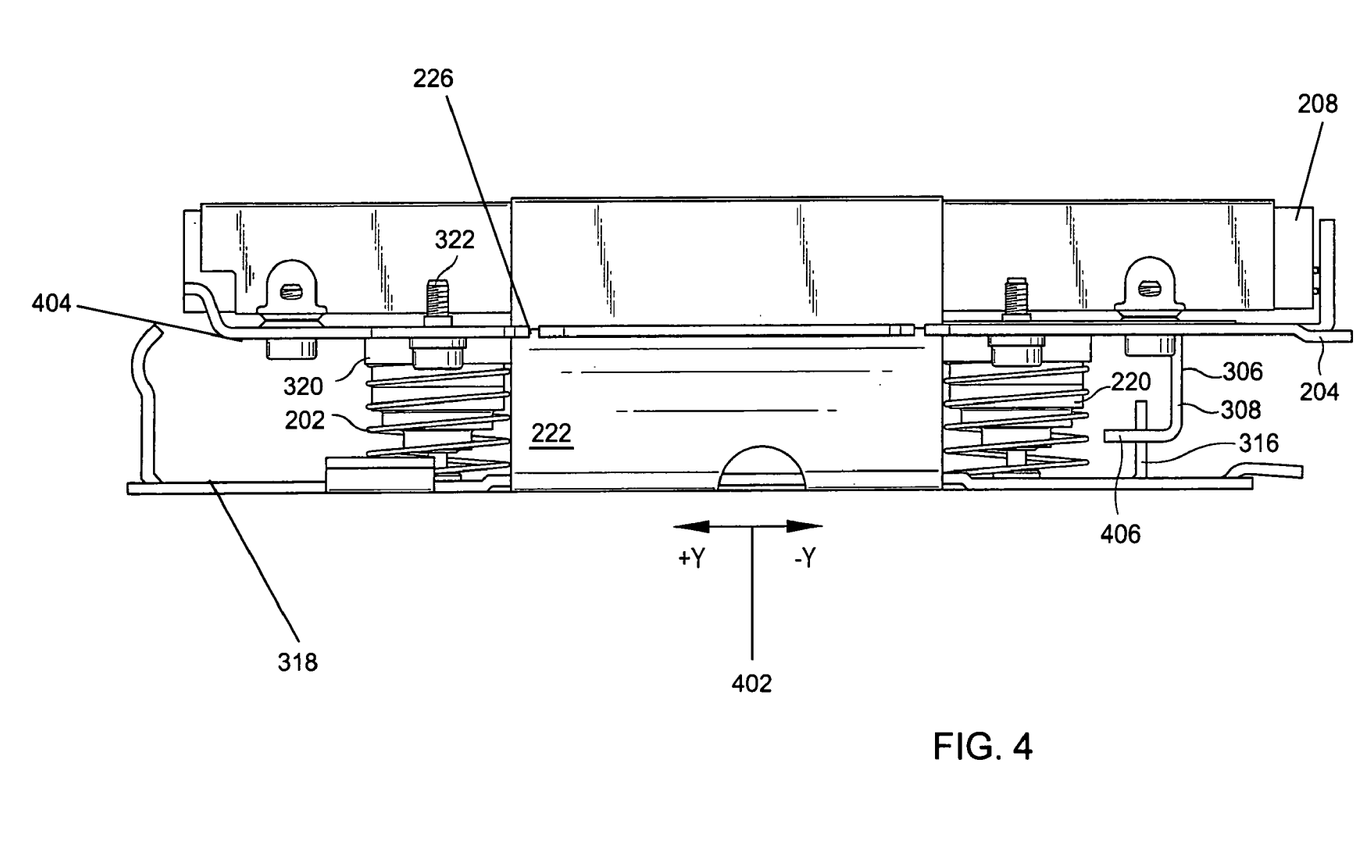
FIG. 4 is a side view of the memory unit mounting module of FIG. 2.

FIG. 3 is a rear view of the memory unit mounting module 118 of FIG. 2. FIG. 4 is a side view of the memory unit mounting module 118 of FIG. 2. The fixing strip 222 may help to keep the electronic memory unit 208 in alignment with the memory unit mounting module 118. The fixing strip 222 may help to limit the movement of the frame 204, the cover 206 and the electronic memory unit 208 in the +X and −X directions opposite to the support plate 120, as indicated by the arrow 302. The fixing strip 222 may help to limit the movement of the frame 204, the cover 206 and the electronic memory unit 208 laterally to the support plate 120 in the +Y and −Y directions as indicated by the arrow 304. The fixing strip 222 may help to limit the movement of the frame 204, the cover 206 and the electronic memory unit 208 laterally to the support plate 120 in the +Z and −Z directions as indicated by the arrow 402. The fixing strip 222 may be positioned in relation to the support plate 120 and the cover 206 so that movement of the frame 204, the cover 206 and the electronic memory unit 208 in each of the +X, −X, +Y, −Y, +Z and −Z directions may be limited to one or more selected distances. As an example, each of the selected distances may be about 2 millimeters or less. As an example, the fixing strip 222 may be formed of a material having adequate tensile strength to endure repeated extensions by force applied in the +X, +Y, −Y, +Z and −Z directions without becoming unduly stretched or breaking, yet having adequate flexibility to permit movement by the frame 204, the cover 206 and the electronic memory unit 208 in the +X, +Y, −Y, +Z and −Z directions. The fixing strip 222 may ensure that the spring elements 202 and the damping elements 220 may remain aligned in the memory unit mounting module 118 even when the navigation device 100 or the module 118 is held in different orientations. As examples, the fixing strip 222 may be made of a plastic or rubber sheet or fabric, or a textile fabric. In an example, the fixing strip may be a polytetrafluoroethylene fabric.

The fixing strip 222 may not influence the collective movement of the frame 204, the cover 206, and the electronic memory unit 208 in the −X direction, as that movement may be controlled by the spring elements 202 and the damping elements 220. The influence of the fixing strip 222 by limiting movement of the frame 204, cover 206 and electronic memory unit 208 in the +X, +Y, −Y, +Z and −Z directions may, however, help to avoid dislocation of the spring elements 202 from alignment in the memory unit mounting module 118. During manufacture of the memory unit mounting module 118, transportation of the module 118, manufacture of the navigation device 100, and utilization of the navigation device 100 in a vehicle, the spring elements 202 may need to remain in alignment so that external motion forces applied to the memory unit mounting module 118 may be controlled and dampened when the module 118 is ultimately installed in a navigation device 100. If, as an example, the spring elements 202 were to jump and then remain out of alignment with the support plate 120 or the frame 204 or both, the damping elements 220 might have to carry all or a portion of the collective weight of the frame 204, the cover 206, and the electronic memory unit 208 in a resting position. In that case, the capability of the memory unit mounting module 118 to provide damping and control over its movement relative to the support plate 120, as induced by external motion forces, might be considerably deteriorated.

As an example, the memory unit mounting module 118 may be manufactured as a separate module or sub-assembly of the navigation device 100. As a consequence, the memory unit mounting module 118 may be separately transported as a sub-assembly. During this transport or during the process of manufacturing the navigation device 100, the memory unit mounting module 118 may not be maintained in the same orientation as when incorporated into the navigation device 100. The orientation of the memory unit mounting module 118 in various navigation devices 100 may also vary. As an example, the memory unit mounting module 118 may not be positioned with the support plate 120 facing downward when the navigation device 100 is installed in a vehicle. In that case, gravity may not induce the spring elements 202 to support the combined weight of the frame 204, the cover 206 and the electronic memory unit 208. In spite of such an orientation, the memory unit mounting module 118 may still ensure that such collective weight is supported by the spring elements 202 and that the spring elements 202 and damping elements 220 remain in alignment in the memory unit mounting module 118.

Referring further to FIGS. 3 and 4, the frame 204 may include a projection 306 attached to a lower surface 404 of the frame 204, including a vertically positioned section 308. As an example, the projection 306 may be L-shaped and include a horizontally positioned end section 406. The horizontally positioned end section 406 may be, as an example, oriented substantially parallel to the frame 204. The horizontally positioned end section 406 may include two horizontally oriented sections 310 and 312 separated by a gap 314. A projecting tab 316 may be secured to the support plate 120 and positioned in alignment with the gap 314 in between the two horizontally oriented sections 310 and 312 of the projection 306. The two horizontally oriented sections 310 and 312 of the projection 306 may limit movement of the projection 306, relative to the projecting tab 316 between them, in the +Y and −Y directions indicated by the arrow 304. The two horizontally oriented sections 310 and 312 of the projection 306 may further limit movement of the projection 306, relative to the projecting tab 316 between them, in the +Z direction indicated by the arrow 402. As an example (not shown), the two horizontally oriented sections 310 and 312 of the projection 306 may fully encircle the projecting tab 316 leaving space between the horizontally oriented sections and the projection 306 in a resting position at one or more selected distances. In this case, the two horizontally oriented sections 310 and 312 of the projection 306 may also limit movement of the projection 306 relative to the projecting tab 316 between them in the −Z direction. These limitations on movement of the projection 306 relative to the projecting tab 316 correspondingly limit movements of the frame 204, the cover 206 and the electronic memory unit 208 relative to the support plate 120.

Alignment and retention of the spring elements 202 and the damping elements 220 within the memory unit mounting module 118 and the operations of these elements are now discussed in further detail. Referring to FIGS. 3 and 4, the spring elements 202 may each at one end meet with an upper surface 318 of the support plate 120 and may at the other end meet with a retention element 320. The retention elements 320 may be attached to the frame 204 by suitable fasteners such as, for example, screws 322. FIGS. 3 and 4 show that although the damping elements 220 may be fixedly connected by the retention elements 320 to the frame 204, the damping elements 220 may not come in contact with the support plate 120, when the memory unit mounting module is in a resting position.

It is understood that the respective functions of the support plate 120 and the frame 204 and the various elements of the memory unit support module 118 that are attached to the frame and support plate may be reversed, for example, as illustrated within the break out section 324 of FIG. 3, where the projection 306 is shown reversed and extending from the support plate 120 and the projecting tab 316 is shown reversed and extending from the frame 204. As an additional example, the damping elements 220 may be attached to the support plate 120 but not be attached to the frame 204. Each of the upper surface 318 of the support plate 120 and the lower surface 404 of the frame 204 constitute interchangeable platforms in this regard.

Figure 5:
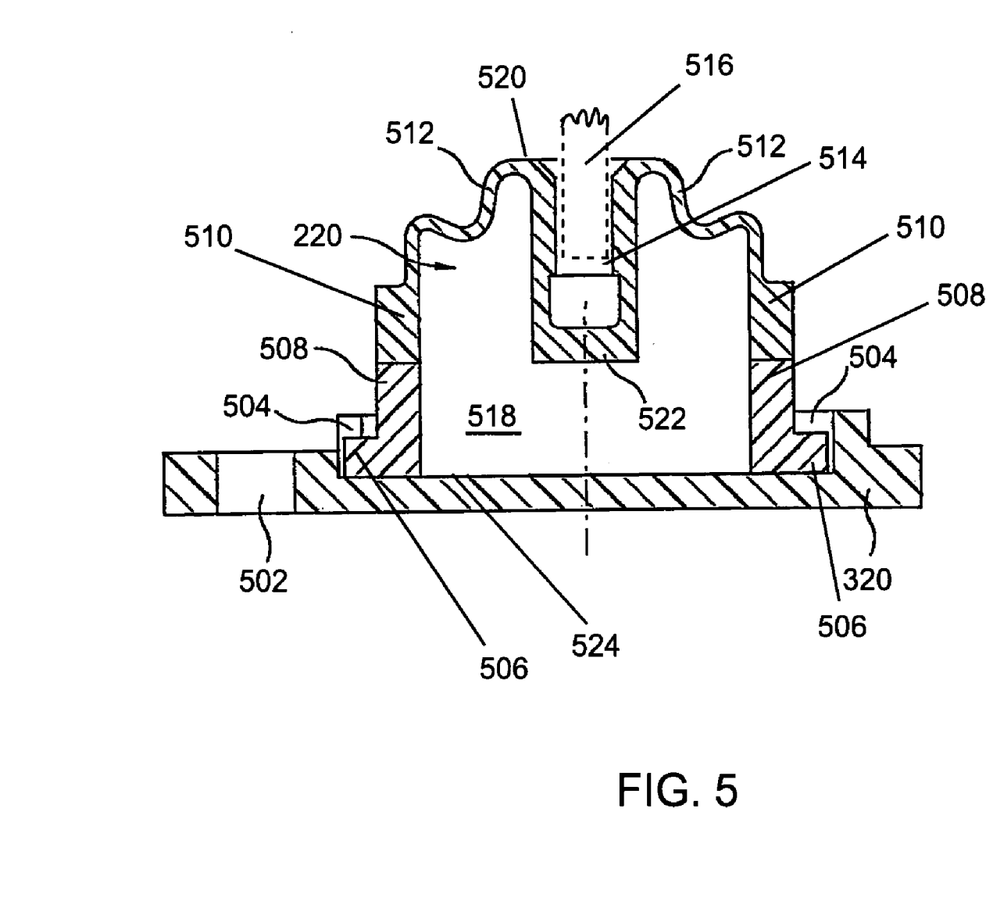
FIG. 5 is a cross-sectional view of an example of a damping element of a memory unit mounting module.

FIG. 5 is a cross-sectional view of an example of a damping element 220 of a memory unit mounting module positioned in a retention element 320. The retention element 320 may be secured to the frame 204 by inserting screws 322 shown in FIGS. 3 and 4 into a through-hole 502 in the retention element 320. The retention element 320 may have a recess 504, that may partially or completely enclose a flange 506 on a first part 508 of the damping element 220. The first part 508 of the damping element 220 may be formed from a material selected to have a greater rigidity than a selected rigidity of a second part 510 of the damping element 220. As an example, the first part 508 of the damping element 220 may be formed of a natural or synthetic polymer material having a relatively rigid structure.

The second part 510 of the damping element 220 may be configured as an elastomeric bellows. As an example, the second part 510 of the damping element 220 may be formed of a natural or synthetic polymer material having a relatively flexible structure. In an example, the first part 508 and the second part 510 of the damping element 220 may be integrally formed by a suitable molding process, or may be separately formed and bonded by adhesive or mechanically interlocking elements such as threads or tabs and slots. The second part 510 of the damping element 220 may include an S-shaped resilient region 512. The second part 510 of the damping element 220 may include a recessed region 514 in the form of a cavity. A guiding pin 516 attached to and projecting from the support plate 120 toward the frame 204, as discussed further below in connection with FIG. 6, may be introduced into the recessed region 514. The damping element 220 may include a reservoir 518. The reservoir 518 may be filled with a compressible fluid. As an example, a liquid having a volume substantially independent of temperatures in a range that may prevail in the memory unit mounting module 118 during use may be selected. As an example, a silicone oil may be utilized.

When an external motion force is applied to the memory unit mounting module 118, the frame 204, the cover 206 and the electronic memory unit 208 may move the damping element 220 in the −X direction indicated by the arrow 302 shown in FIG. 3, toward the support plate 120. When a tip 520 of the damping element 220 is accordingly brought into contact with the support plate 120, the S-shaped resilient region 512 of the damping element 220 may be deformed by the guiding pin 516. The S-shaped resilient region 512 of the damping element 220 may accordingly be moved by the guiding pin 516 in the direction +X towards the retention element 320 shown in FIGS. 3 and 4 until a lower surface 522 of the recessed region 514 may come into contact with an upper surface 524 of the retention element 320. The movement of the damping element 220 in the +X direction may be arrested when the lower surface 522 of the recessed region 514 comes into such contact with the upper surface 524 of the retention element 320. As an example, when the memory unit mounting module 118 is in a resting position, the damping element 220 may be shaped as shown in FIG. 5. When the memory unit mounting module 118 is exposed to external motion forces, a resulting collective movement of the frame 204, the cover 206 and the electronic memory unit 208 in the direction −X, as an example, may first be decelerated by the spring elements 202. If such resulting movement is sufficiently strong to move the tip 520 of the damping element 220 into contact with the support plate 120, then the damping element 220 may further decelerate this collective movement.

Figure 6:
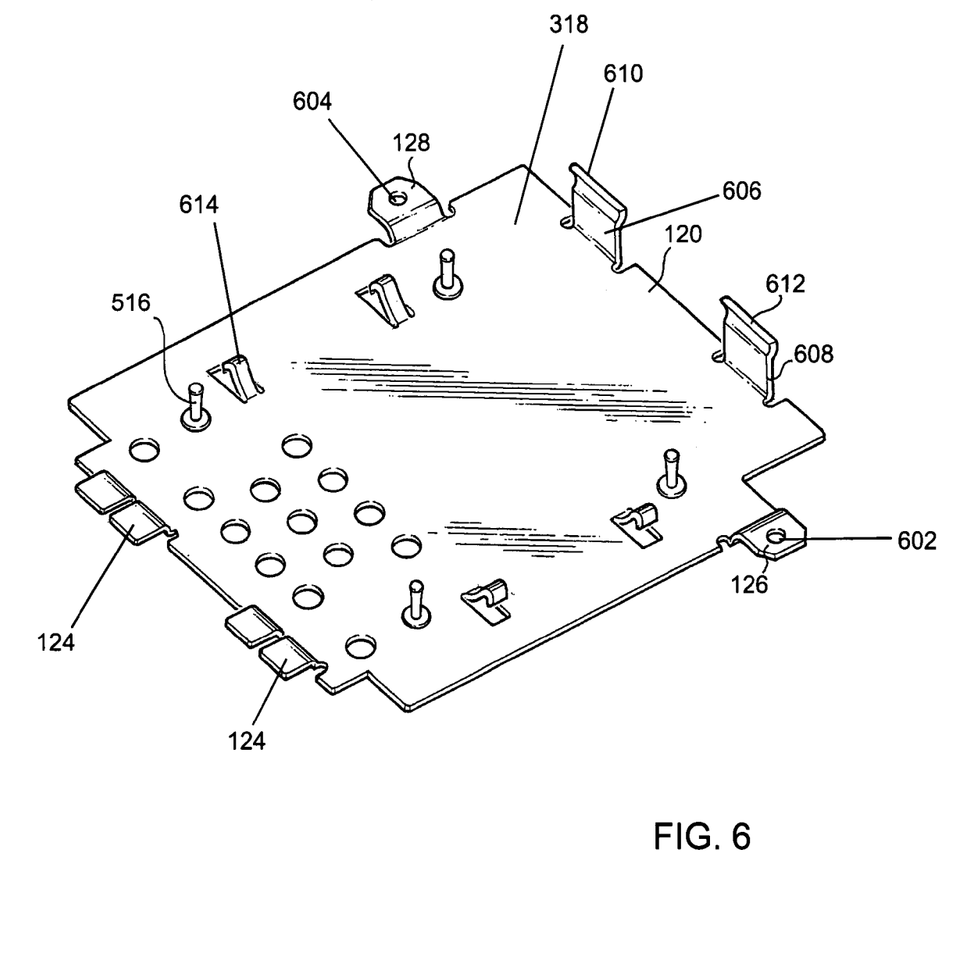
FIG. 6 is a plan perspective view of the support plate of the memory unit mounting module of FIG. 2.

FIG. 6 shows the upper surface 318 of the support plate 120 in further detail. The support plate 120 may include guiding pins 516. As an example, the guiding pins 516 may be press-fitted into through-holes (not shown) in the support plate 120. The guiding pins 516 may help to guide movement of the damping elements 220 generally in the +X and −X directions shown in FIG. 3. In an example where the damping elements 220 may be positioned inside the spring elements 202 as shown in FIGS. 3 and 4, the guiding pins 516 accordingly may also help to guide movement of the spring elements 202 generally in the +X and −X directions. The support plate 120 may include one or more laterally extending arms 126 and 128. As an example, the laterally extending arms may include fastener holes 602 and 604, in which suitable fasteners (not shown) may be introduced to securely attach the support plate 120 to the housing 102 of the navigation device 100, as shown in FIG. 1. The support plate 120 may include vertically arranged extensions 606 and 608, which may as an example have curved ends 610 and 612, respectively. The vertically arranged extensions 606 and 608 may guide an outboard end 142 of the memory unit mounting module 118 into place as the module is installed in the navigation device 100 as shown in FIG. 1. The curved ends 610 and 612 on the vertically arranged extensions 606 and 608 may then lock the memory unit mounting module 118 into place in the navigation device 100 at a position flush with the bottom side 104 of the housing 102, as shown in FIG. 1.

Figure 7:
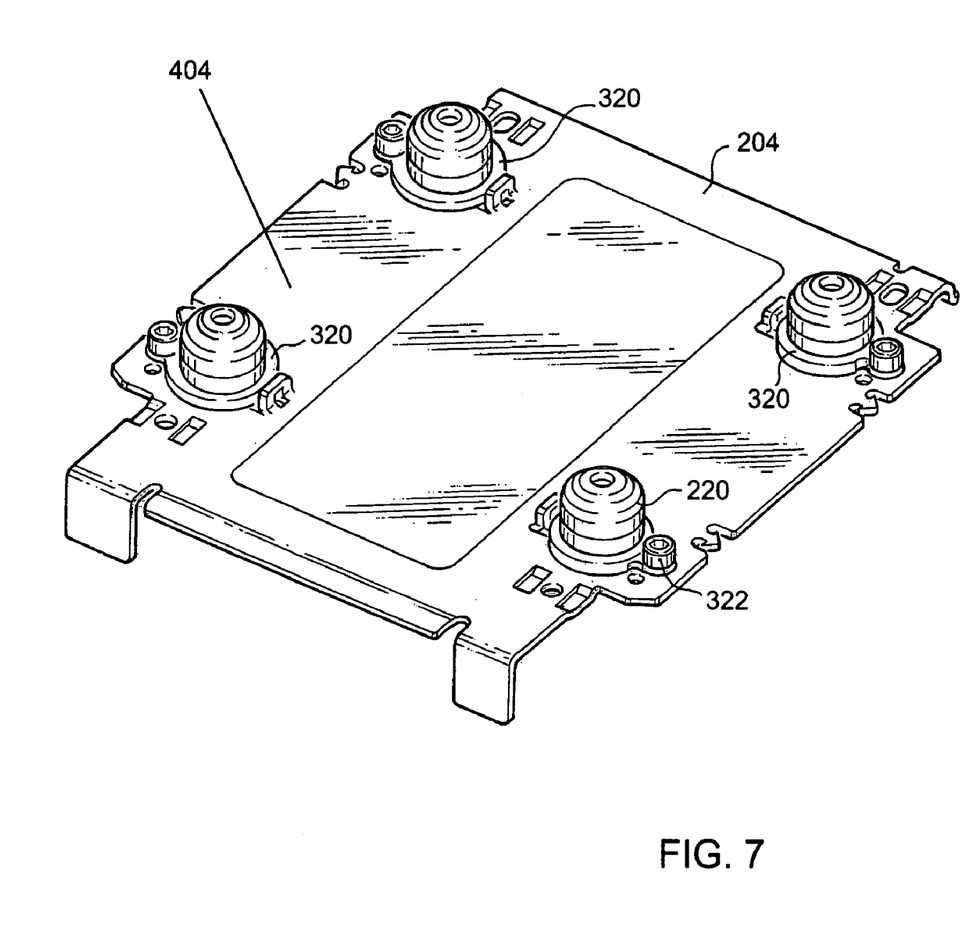
FIG. 7 is a perspective view of the frame for the memory unit mounting module of FIG. 2.
Figure 8:
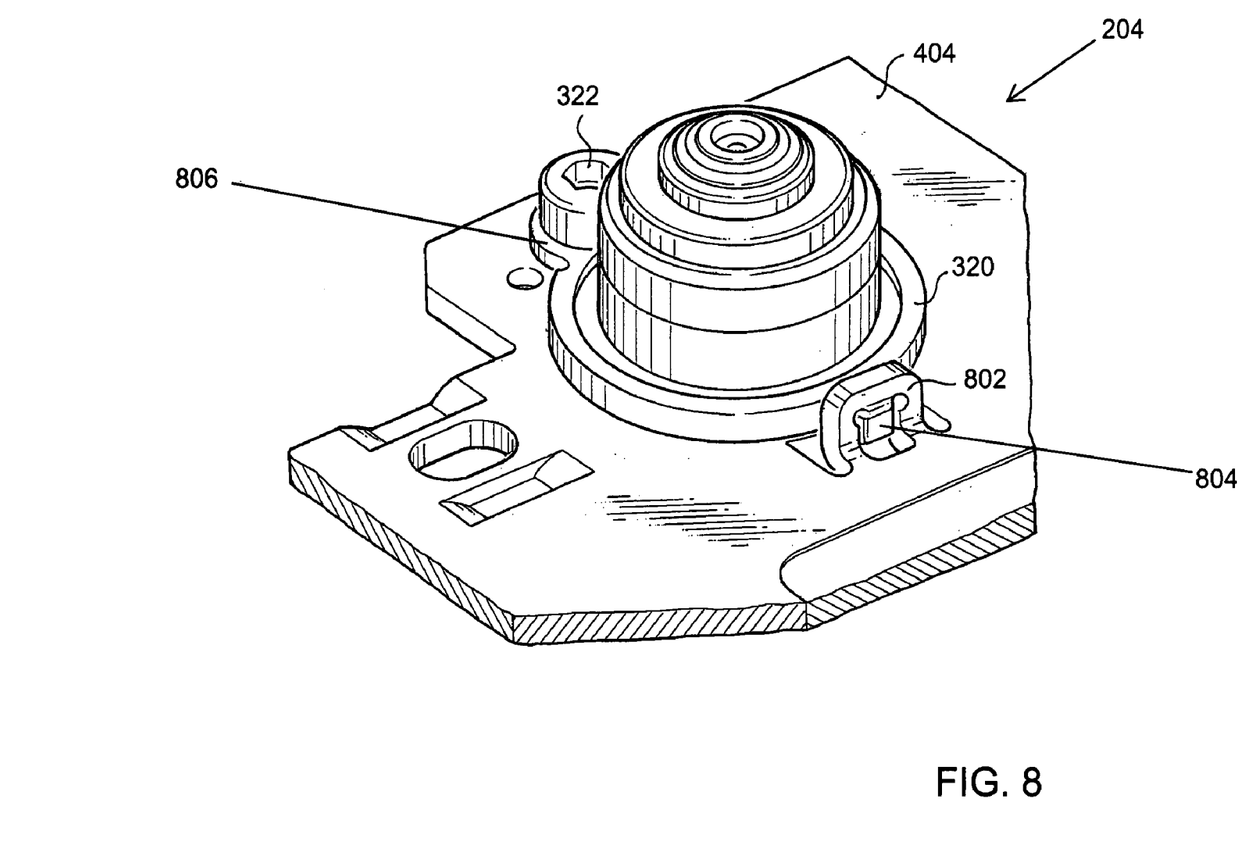
FIG. 8 is an enlarged cut-away view of a retention element attached to the frame of FIG. 7.

FIG. 7 shows the lower surface 404 of the frame 204 in further detail. The retention elements 320 may be attached to the lower surface 404 of the frame 204 using the screws 322. The damping elements 220 may be attached to the retention elements 320. FIG. 8 shows a retention element 320 attached to the lower surface 404 of the frame 204 in further detail. The frame 204 may include an eyelet 802 directed in a vertical direction. As an example, the eyelet 802 may be a deformed partial cutout of the frame 204. A first end 804 of the retention element 320 may be inserted into the eyelet 802 in order to attach the first end 804 to the frame 204. A second end 806 of the retention element 320 may include a thread hole 502, into which a screw 322 may be introduced to attach the second end 806 to the frame 204, so that the retention element 320 may be secured to the frame 204.

Figure 9:
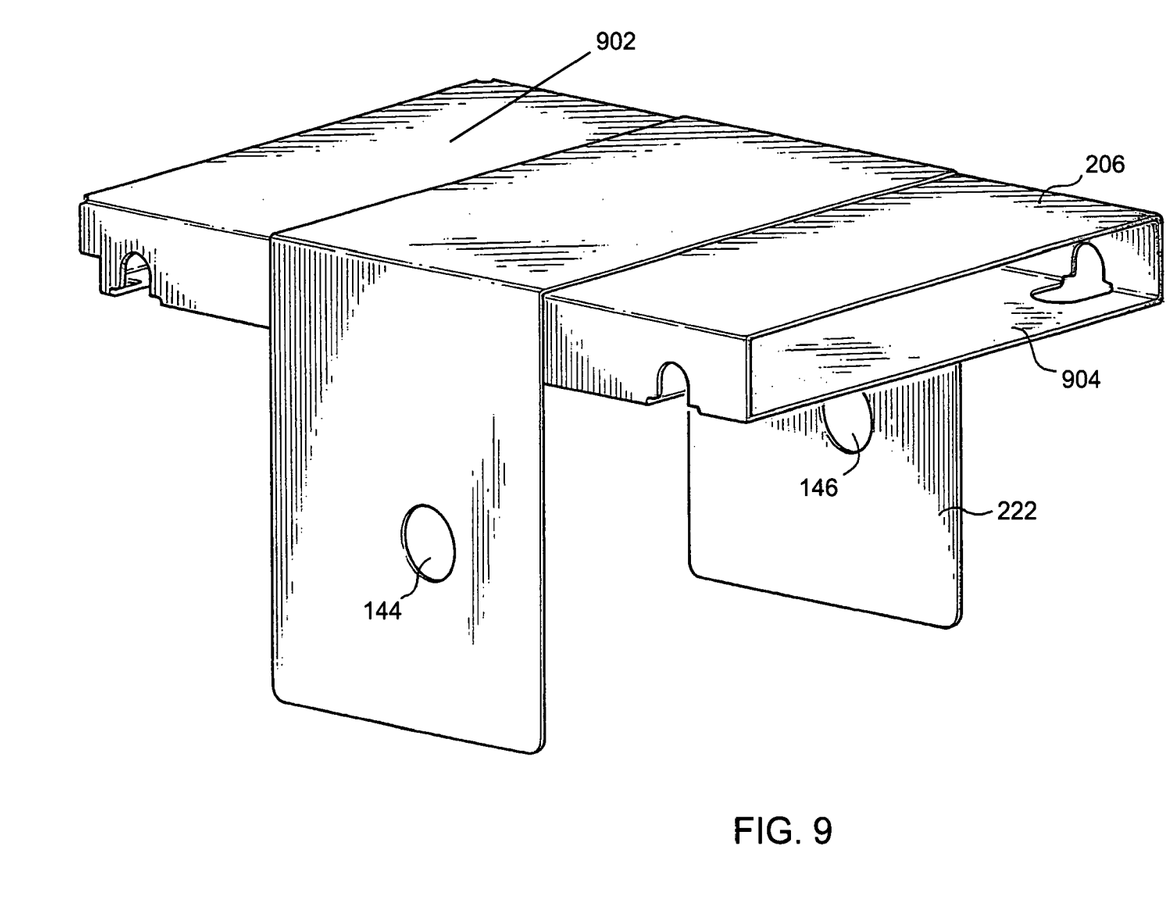
FIG. 9 is a perspective view of the cover and fixing strip of the memory unit mounting module of FIG. 2.

FIG. 9 shows the cover 206 and the fixing strip 222 in further detail. The fixing strip 222 is wrapped around an upper surface 902 of the cover 206. The electronic memory unit 208 (not shown) may be introduced into a front opening 904 of the cover 206. The fixing strip 222 may include openings 144 and 146 also shown in FIG. 1. The openings 144 and 146 may be located so that when the fixing strip 222 is wrapped around the support plate 120, and the support plate 120 is completely installed into the housing 102 of the navigation device 100 as indicated in FIG. 1, edge portions 232 of the support plate 120 as shown in FIG. 3 are exposed. The exposed edge portions 232 of the support plate may make electrical contact with the bottom side 104 of the housing 102. This electrical contact may reduce any potential escape of electromagnetic radiation or of an electrostatic charge from the navigation device 100.

Figure 10:
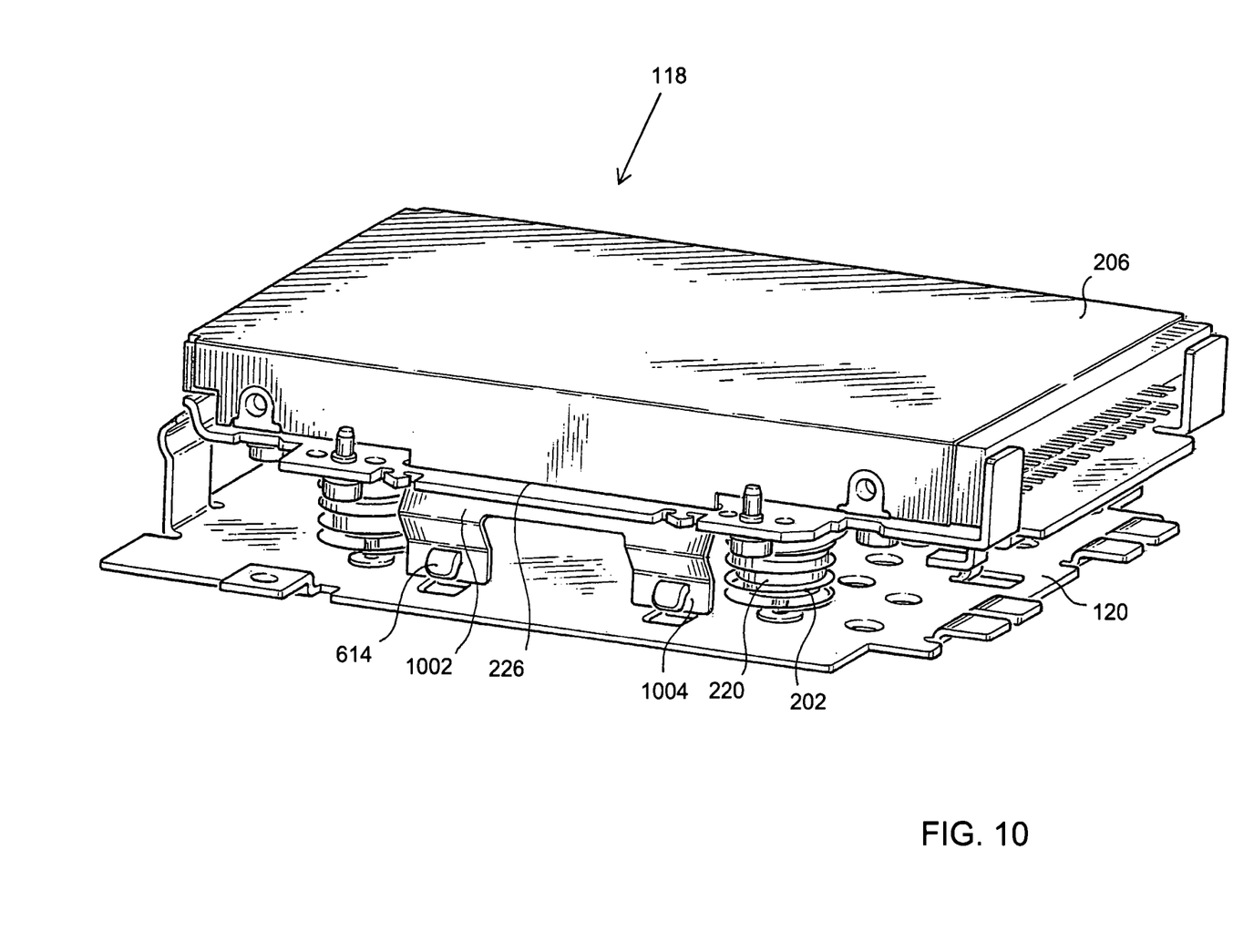
FIG. 10 is a perspective view of an example of a memory unit mounting module include vertically disposed resilient extensions.
Figure 11:
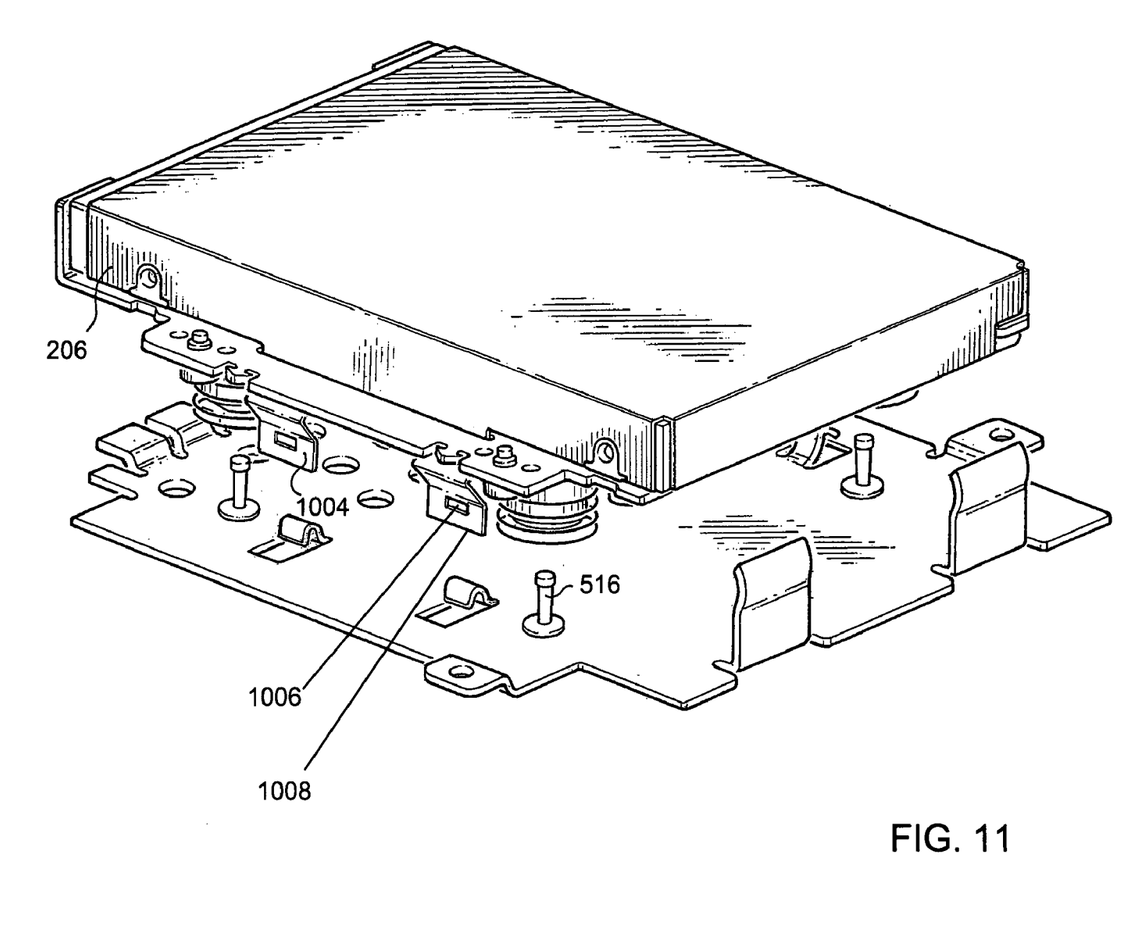
FIG. 11 is an exploded perspective view of the memory unit mounting module of FIG. 10.
Figure 12:
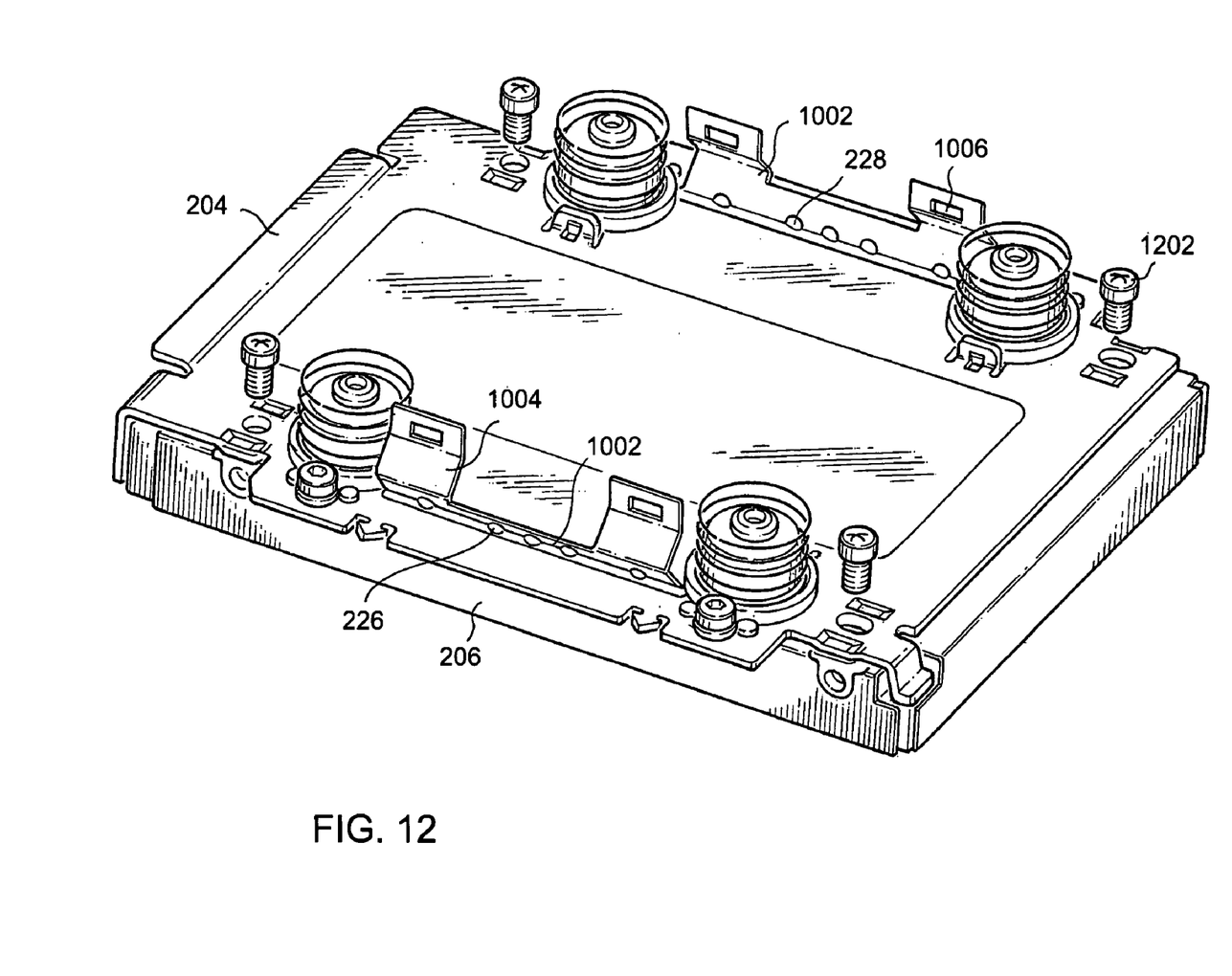
FIG. 12 is a rear perspective view of the memory unit mounting module of FIG. 10 with the support plate removed.

FIG. 10 is a perspective view of an example of a memory unit mounting module including vertically disposed resilient extensions. FIG. 11 is an exploded perspective view of the memory unit mounting module of FIG. 10. FIG. 12 is a bottom perspective view of the memory unit mounting module of FIG. 10 with the support plate removed.

FIG. 10 shows the memory unit mounting module 118 from a perspective with the support plate 120 facing downward. As an example, two vertically disposed resilient extensions 1002 also shown in FIG. 12 may be attached to or integrally formed with the cover 206. The vertically disposed extensions 1002 may each include one or more resilient arms 1004. The vertically disposed resilient extensions 1002 and the resilient arms 1004 may have an undulated or sinuous form, the undulation providing or adding to the resilient properties of the extensions and arms. As an example, the vertically disposed extensions 1002 may be made of a flexible material as discussed in connection with the fixing strip 222. Each resilient arm 1004 may include an opening 1006, shown in FIG. 11, near the end 1008 of the resilient arm. A hook 614, as an example either attached to or cut out from the support plate 120 and also shown in FIG. 6, may be engaged with the opening 1006. The vertically disposed extensions 1002 may help to limit the movement of the frame 204, cover 206 and electronic memory unit 208 with respect to the memory unit mounting module 118 in the +X, +Y, −Y, +Z and −Z directions as earlier discussed in connection with the fixing strip 222. The vertically disposed extensions 1002 may pass through cut-outs sections 226 and 228 of the frame 204, as already explained in connection with FIG. 2. FIG. 11 shows an exploded view of the navigation device 100 modified as discussed in connection with FIG. 10. FIG. 12 shows a bottom view of the navigation device 100 modified as discussed in connection with FIG. 10. The vertically disposed extensions 1002 may pass the cut-outs 226 and 228 in the frame 204. As an example, the frame 204 may be connected with the cover 206 and the electronic memory unit 208 using screws 1202.

The navigation device 100 and the memory unit mounting module 118 may reduce adverse effects of external motion forces such as shocks and vibrations on the operation of an electronic memory unit 208 in such a navigation device installed in a vehicle. The electronic memory unit 208 may be able as a result to properly function even in environments where it may be exposed to strong vibrations or shocks.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A memory unit mounting module for a vehicle navigation device, comprising:
    a memory unit spaced apart at a distance from a support plate;
    at least one spring element supporting the memory unit;
    at least one damping element for absorbing shock and vibration of the memory unit
    a projection on and extending from the memory unit partially across the distance, the projection including two spaced apart projection portions each extending substantially parallel to the support plate; and
    a tab on and extending from the support plate and partially across the distance, the tab positioned between the spaced apart projection portions, the projection and the tab being configured to limit a distance of travel of the memory unit relative to the support plate.

2. The memory unit mounting module of claim 1, including a fixing strip binding together the memory unit with the support plate, and limiting the distance.

3. The memory unit mounting module of claim 2, including a frame;
    the memory unit attached to the frame;
    a cutout in the frame through which the fixing strip passes;
    the cutout configured to maintain the fixing strip in alignment with the memory unit, frame and support plate.

4. The memory unit mounting module of claim 2, including
a frame;
the memory unit attached to the frame;
a cutout in the support plate through which the fixing strip passes;
the cutout configured to maintain the fixing strip in alignment with the memory unit, frame and support plate.

5. The memory unit mounting module of claim 2, in which the fixing strip is configured to apply tension to the spring element when the memory unit is in a resting position.

6. The memory unit mounting module of claim 1, in which the two spaced apart projection portions collectively enclose a gap, the tab passing through the gap.

7. The memory unit mounting module of claim 1, including
a cover on the memory unit;
a resilient extension on the cover and extending partially across a distance between the memory unit and the support plate;
the resilient extension having two resilient arms extending further partially across the distance between the memory unit and the support plate;
the resilient arms being attached to the support plate.

8. The memory unit mounting module of claim 7 including
an opening in each of the resilient arms; and
a hook attached to the support plate and configured to be inserted into each opening.

9. The memory unit mounting module of claim 7, in which the resilient extension includes an undulation.

10. The memory unit mounting module of claim 1, in which the damping element is configured as an elastomeric bellows;
and in which a first part of the elastomeric bellows is formed from a material selected to have a greater rigidity than a selected rigidity of a second part of the elastomeric bellows.

11. A memory unit mounting module for a vehicle navigation device, comprising:
a memory unit spaced apart at a distance from a support plate;
at least one spring element supporting the memory unit;
at least one damping element for absorbing shock and vibration of the memory unit
a projection on and extending from the support plate partially across the distance, the projection including two spaced apart projection portions each extending substantially parallel to the support plate; and
a tab on and extending from the memory unit partially across the distance and positioned between the spaced apart projection portions, the projection and the tab being configured to limit a distance of travel of the memory unit relative to the support plate.

12. The memory unit mounting module of claim 11 in which the two spaced apart projection portions collectively enclose a gap, the tab passing through the gap.

13. The memory unit mounting module of claim 11, including a fixing strip binding together the memory unit with the support plate, and limiting the distance.

14. The memory unit mounting module of claim 11, including
a frame;
the memory unit attached to the frame;
a cutout in the frame through which the fixing strip passes;
the cutout configured to maintain the fixing strip in alignment with the memory unit, frame and support plate.

15. The memory unit mounting module of claim 14 including
a frame;
the memory unit attached to the frame;
a cutout in the support plate through which the fixing strip passes;
the cutout configured to maintain the fixing strip in alignment with the memory unit, frame and support plate.

16. The memory unit mounting module of claim 14, in which the fixing strip is configured to apply tension to the spring element when the memory unit is in a resting position.

17. The memory unit mounting module of claim 11, in which the two spaced apart projection portions collectively enclose a gap, the tab passing through the gap.

18. The memory unit mounting module of claim 11, including
a cover on the memory unit;
a resilient extension on the cover and extending partially across a distance between the memory unit and the support plate;
the resilient extension having two resilient arms extending further partially across the distance between the memory unit and the support plate;
the resilient arms being attached to the support plate.

19. The memory unit mounting module of claim 18, including
an opening in each of the resilient arms; and
a hook attached to the support plate and configured to be inserted into each opening.

20. The memory unit mounting module of claim 11, in which the damping element is configured as an elastomeric bellows;
and in which a first part of the elastomeric bellows is formed from a material selected to have a greater rigidity than a selected rigidity of a second part of the elastomeric bellows.

* * * * *